May 20, 1969 M. W. UITVLUGT 3,444,950
VEHICLE SPEED GOVERNOR
Filed Aug. 3, 1966 Sheet 1 of 3
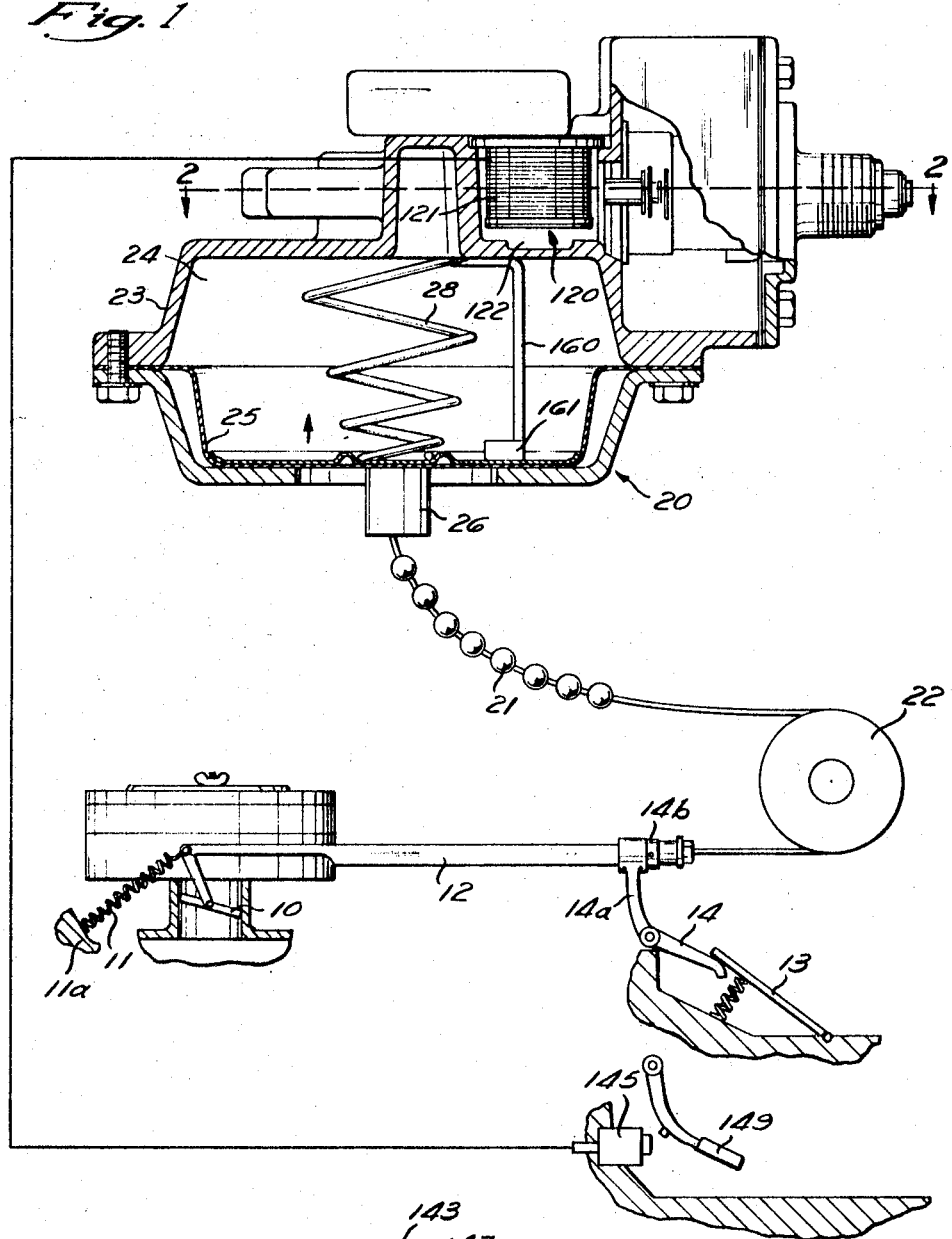
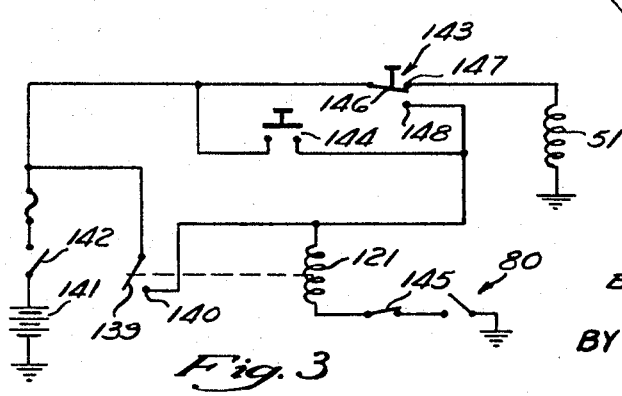
INVENTOR
MARTIN W. UITVLUGT
BY HOFFMANN AND YOUNT
BY
ATTORNEYS

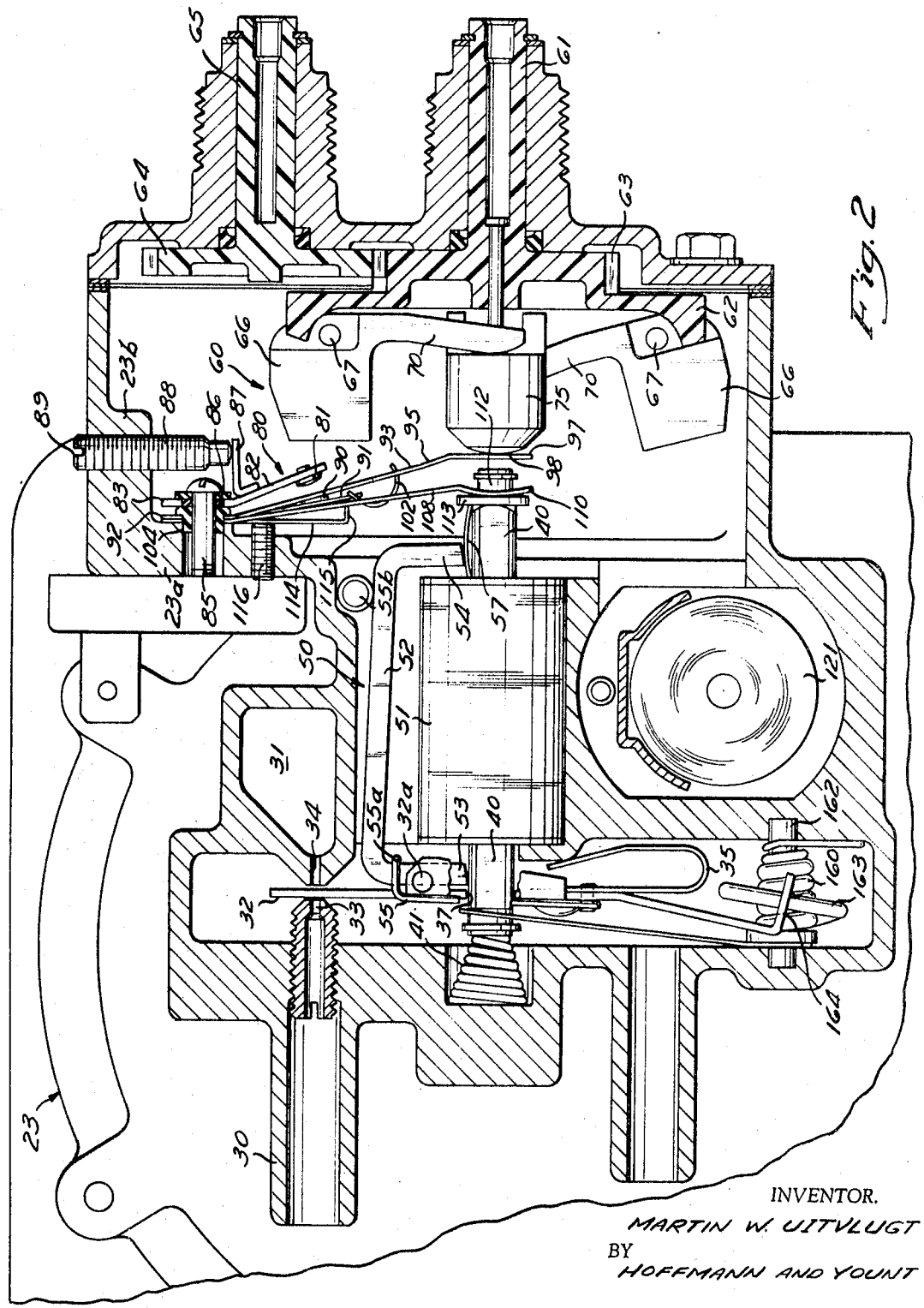

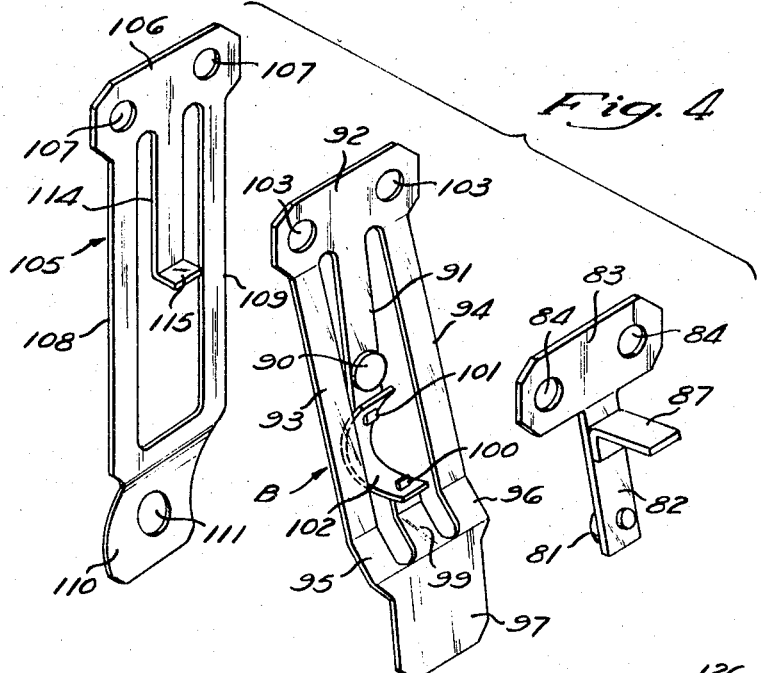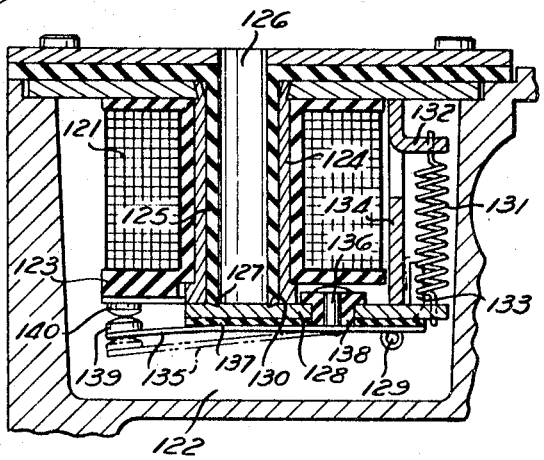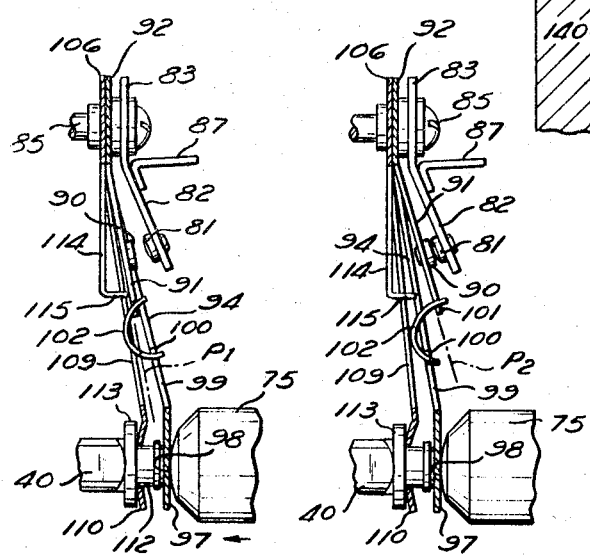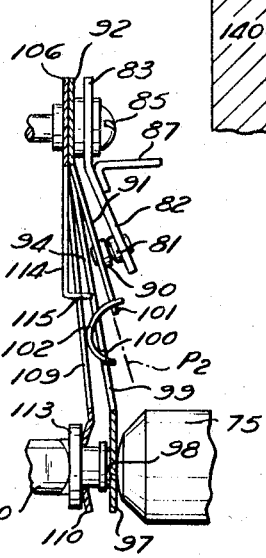

United States Patent Office 3,444,950
Patented May 20, 1969

3,444,950
VEHICLE SPEED GOVERNOR
Martin W. Uitvlugt, Battle Creek, Mich., assignor to Eaton Yale & Towne Inc., Cleveland, Ohio, a corporation of Ohio
Filed Aug. 3, 1966, Ser. No. 569,985
Int. Bl. B60k 31/00
U.S. Cl. 180—105                    10 Claims

ABSTRACT OF THE DISCLOSURE

A vehicle control mechanism is controlled by electrically energizable coil means, which coil means is energized by a switch mechanism. The switch mechanism is controlled by a speed sensing means movable in accordance with vehicle speed. The switch mechanism comprises a self-biased over-center snap-acting mechanism operated by the speed sensing means and movable by the speed sensing means against its self-bias to an over-center position in which the switch is closed and which opens when the vehicle speed decreases below the predetermined speed.

---

This invention relates to improvements in vehicle control mechanisms, and particularly in speed governors for controlling the speed of an automotive vehicle.

Various speed governors have been proposed heretofore for use on automotive vehicles to enable the vehicle to maintain a predetermined speed without requiring the driver to keep his foot on the accelerator pedal. The convenience and other advantages of such speed governors are well recognized.

Preferably, such governor control over the vehicle speed should only be used at speeds above a predetermined minimum, normally about 25 miles per hour. To this end, it has been proposed previously to provide a minimum speed switch for ensuring that the speed governor could not be in operation at vehicle speeds below a predetermined minimum. One important aspect of the present invention is directed to providing a speed governor having a novel minimum speed switch which will close when the vehicle speed has increased to a predetermined minimum speed, but will not re-open until the vehicle speed drops a certain amount below that minimum speed, so that the governor turn-off speed is less than the governor turn-on speed.

In vacuum-operated speed governors, various vacuum-release valves have been provided which operate alternatively to connect the vacuum chamber in the governor to the atmosphere, thus disabling the governor, or to block the vacuum chamber from the atmosphere, so that the governor may be used to control the vehicle speed. Another important aspect of the present invention is concerned with the provision in a vacuum-operated speed governor of a novel vacuum-release valve having a reliable "fail-safe" mode of operation.

An object of the present invention is to provide an improved vehicle speed governor having a novel minimum speed switch which provides a speed differential between the minimum governor turn-on speed and the turn-off speed.

Another object of this invention is to provide such a speed governor in which the minimum turn-on and turn-off speeds may be selectively determined individually by simple adjustments of the minimum speed switch.

Another object of this invention is to provide such a speed governor in which the minimum speed switch has a quick-acting and positive operation which minimizes arcing between its contacts and enhances its durability.

A further object of this invention is to provide an improved vacuum-operated speed governor having a novel vacuum-release valve with a "fail-safe" mode of operation that does not depend on the pressure differential between the atmosphere and the vacuum chamber of the governor.

A further object of this invention is to provide an improved vacuum-operated speed governor having a novel minimum speed switch and a novel vacuum release valve which jointly control the operability of the speed governor.

Further objects and advantages of the present invention will be apparent to those skilled in the art to which it relates from the following detailed description of the preferred embodiment thereof made with reference to the accompanying drawings forming a part of this specification and in which:

FIG. 1 is a schematic view illustrating a speed governor embodying the improvements of the present invention;

FIG. 2 is an enlarged fragmentary section through a portion of this speed governor, taken generally along the line 2—2 in FIG. 1;

FIG. 3 is a simplified schematic diagram of the electrical control circuit in the present governor;

FIG. 4 is an exploded perspective view of the minimum speed switch in the present governor;

FIG. 5 is a longitudinal sectional view showing this switch just before it is closed;

FIG. 6 is a similar view showing the switch just after it has been closed; and

FIG. 7 is an enlarged longitudinal sectional view of the vacuum release valve in the present speed governor.

The present invention provides an improved vehicle control mechanism which includes electrical switch means closed at a predetermined vehicle speed to render the control operable. The control mechanism may comprise a speed governor or overdrive mechanism, or the like. The preferred embodiment of the present invention to be described hereinbelow is a speed governor mechanism.

The speed governor of FIG. 1 is used for controlling the position of a throttle control member 10 of the automotive vehicle in which the speed governor is utilized. The throttle control member 10 is movable from a closed position, illustrated in FIG. 1, to a fully open position in a throttle opening direction for increasing the vehicle speed and is moved in the reverse direction to a closed position for decreasing vehicle speed. The throttle member 10 is biased to its closed position by a spring 11, one end of which engages a suitable fixed support member 11a and the other end of which engages one end of a rod 12 which is connected to the throttle member 10. The rod 12 is connected to the throttle member 10 so as to effect movement of the throttle member 10 between its positions upon linear movement thereof. As viewed in FIG. 1, when the rod 12 moves to the right, the throttle member 10 moves in its throttle opening direction and when the rod member 12 moves to the left, the throttle member 10 moves in a throttle closing direction.

The rod 12 is, as noted above, biased by the spring 11 to the left and is moved to the right by depression of the accelerator pedal 13 of the automotive vehicle. As the accelerator pedal 13 is depressed, the spring 11 applies a greater force tending to bias the rod 12 against movement by the accelerator pedal. The accelerator pedal 13, when depressed by the operator's foot, actuates a bell crank link member 14 in the embodiment shown in FIG. 1, and effects movement of the arm 14a thereof, which forms a part of the link 14, toward the right. The arm 14a is slidably mounted on the rod 12 and engages a collar 14b thereon to effect movement of the rod 12 toward the right when the arm moves toward the right, thereby effecting movement of the throttle member 10 in a throttle opening direction.

The throttle 10 also may be moved in its throttle opening direction by means of a speed governor unit 20 which is operatively connected to the rod 12, such as by means of a flexible chainlike member 21 trained around suitable pulleys, as shown, or by means of a sheathed tension cable (not shown), similar to a Bowden wire, connected to the carburetor throttle lever by a lost-motion linkage to permit manual override of the tension cable. Such a tension cable is advantageous in that it permits a more random positioning of the governor 20 for the most desirable routing of the speedometer drive cables and is less susceptible to foundering by engine compartment components. The speed governor unit 20 is of the so-called vacuum type and includes a housing 23 which defines in part a vacuum chamber 24, and supports a flexible diaphragm 25 which forms a wall of the vacuum chamber 24. The diaphragm 25 is connected by means of a suitable clip 26 to the end of the chain member 21 opposite the end connected with the rod 12. Movement of the flexible diaphragm 25 in the direction of the arrow, shown in FIG. 1, is in the direction to effect movement of the rod 12 toward the right, as viewed in FIG. 1, through the chain connection 21 and movement of the throttle member in its throttle opening direction.

The diaphragm 25 is moved in the direction of the arrow shown in FIG. 1 in response to the creation of a vacuum in the vacuum chamber 24 and is biased to its position shown in FIG. 1 by means of a suitable spring 28 and spring 11. When the vacuum in the chamber 24 and the force applied by springs 11 and 28 balance, the diaphragm 25 stops moving and is in an equilibrium condition. If the vacuum is then either increased or decreased, the diaphragm will move. If the vehicle speed decreases, as when the vehicle goes up a hill, the vacuum will increase to move the diaphragm to increase the throttle opening. If the vehicle speed increases, as when the vehicle goes down a hill, the vacuum will decrease and the diaphragm will move so that the spring 11 will decrease the throttle opening.

The vacuum in the vacuum chamber 24 is provided through a suitable vacuum connection 30 (FIG. 2) in the housing 23 which is connected by suitable conduits, not shown, to the intake manifold of the vehicle to apply a vacuum thereat. The chamber 24 also communicates with the atmosphere through a suitable connection 31 (FIG. 2), spaced slightly from the vacuum connection 30 and opposite thereto.

The vacuum in the chamber 24 is controlled by a valve member or flapper member 32 (FIG. 2), the operation of which will be described in detail hereinbelow but which, in general, controls the amount of communication between the vacuum connection 30 and atmosphere connection 31 and the chamber 24. The valve or flapper member 32 is an elongated member which extends between nozzlelike openings 33, 34 connecting the vacuum and atmospheric connections 30, 31 with the chamber 24. The flapper member 32 is movable relative to the nozzle openings 33, 34 and, when positioned adjacent to the nozzle opening 33 it substantially blocks communication between the vacuum conduit 30 and the vacuum chamber 24, and the chamber 24 thus is at substantially atmospheric pressure and the diaphragm member 25 is in the position shown in FIG. 1. When the flapper member 32 moves away from the nozzle 33, the vacuum connection 30 then communicates with the chamber 24 and a vacuum is established therein causing the diaphragm member 25 to move in its throttle opening direction (upward in FIG. 1) to effect opening movement of the throttle member 10. The flapper member 32 specifically is a flat strip member which extends between the adjacent nozzles 33 and 34, respectively, and is biased by a suitable leaf spring 35 (FIG. 2) into engagement with the nozzle 33, thereby blocking communication between the vacuum connection 30 and the chamber 24.

The flapper member 32 is moved to the right, as viewed in FIG. 2, when the speed governor unit 20 is actuated in response to a decrease in vehicle speed. When this occurs, a vacuum is established in the chamber 24 in accordance with the amount of movement of the flapper member. This causes movement of the diaphragm member 25 in its throttle opening direction to hold the vehicle speed near the desired speed. The movement of the flapper member 32 is effected in response to movement of a core member 40, which moves right and left, as viewed in FIG. 2, in response to changes in vehicle speed. The core member 40 moves to the left, as viewed in FIG. 2, upon an increase in vehicle speed, and moves to the right, as viewed in FIG. 2, upon a decrease in vehicle speed, as will be described in detail hereinbelow. The left end of the core member, as viewed in FIG. 2, extends slidably through an opening 37 in the flapper member 32. A suitable spring member 41 is supported in the housing 23 and engages the left end of the core member 40, as viewed in FIG. 2, and biases the core member 40 to the right.

The speed governor unit 20 includes a locking mechanism 50 for locking the core member 40 to the flapper member 32 to cause these members to move together so that when the core member moves in response to vehicle speed, the flapper member 32 likewise moves. The locking mechanism 50 includes an electrical coil 51, positioned encircling the core member 40. A suitable locking bracket member or link member 52 straddles the coil member 51 end-to-end and is engageable with the core member 40 at the opposite axial ends of the coil member 51. The link member 52 is U-shaped and the legs 53 and 54 of the link member 52 are positioned at the opposite ends of the coil 51 and the extreme ends of the legs 53, 54 engage the core member 40 when the coil 51 is energized.

The leg 53 of the link 52 intermediate its ends is pivotally supported by a cross pin 32a carried by the flapper member 32. A flexible and resilient connection in the form of a bifurcated spring wire member 55 couples the leg 53 of link member 52 resiliently to the flapper member 32. This spring wire has its opposite legs attached to the flapper member 32, and these legs are joined by a bight portion 55a extending across the inside of leg 53. This spring wire 55 biases link member 52 counterclockwise in FIG. 2 against an adjustable eccentric stop 55b.

In order to lock the core member 40 to the flapper member 32, the coil 51 is energized causing movement of the link 52 by magnetic attraction clockwise from the FIG. 2 position. Because of the construction and arrangement of the flapper member 32, core 40, and link 52, when the coil 51 is energized, the lower end of the leg 53 of the link 52 first locks to the core member 40 and becomes a temporary fulcrum for the link 52, and the flapper member 32 and the link 52 pivot as a unit. The flapper member 32 due to the pivoting movement moves from contact with the nozzle 33, and, as will be described in detail hereinbelow, moves to a position located a distance from the nozzle 33 to have the appropriate vacuum applied in the chamber to hold the throttle member at the desired speed.

The link 52 then pivots about the pivot pin 32a carried by the flapper member 32, with its opposite leg 54 moving down toward the core 40 to lock the latter to the flapper member 32. Thus, with the core member 40 locked to the flapper member 32 through the energization of the coil 51, upon a decrease in vehicle speed the flapper will move to the right, as viewed in FIG. 2, in unison with the core member 40. This causes movement of the flapper 32 from its position in a direction away from the vacuum nozzle 33 and effects greater communication of the vacuum nozzle 33 with the vacuum chamber 24 and effects the creation of a greater vacuum in the chamber 24 and movement of the diaphragm 25 in its throttle opening direction.

When the coil 51 is de-energized, the spring wire 55 tends to return the link 52 to the position illustrated in FIG. 2. A suitable leaf spring 57, shim, or other spacing means is preferably provided on the core and engages lower end of the leg 54 of the link 52 to assist in moving the link 52 from the locking position back to the position shown in FIG. 2. The spring 57, however, does not interfere with the locking of the link 52 to the core 40.

As already pointed out, the vacuum in the vacuum chamber 24 is controlled, when the electrical coil 51 is energized, by movement of the flapper 32 relative to the vacuum nozzle 33 upon movement of the core member 40. The core member 40 is moved in response to increases and decreases in speed of the vehicle by means of a vehicle speed sensing mechanism, generally designated 60. The mechanism 60 senses the speed of the vehicle and effects movement of the core member 40 in response to changes in the speed. The mechanism 60 includes a suitable input drive connection 61 that can be connected with the transmission or front wheel of the vehicle and is driven at a speed in proportion to the speed of the vehicle. The connection 61 is a projection of a drive carriage 62 which has a gear portion 63. The gear portion 63 thereof meshes with a gear 64 having a shaft portion 65 connected thereto and which shaft portion is adapted to be connected with the speedometer of the automotive vehicle.

The carriage 62 carries a plurality of weight members 66 which are pivotally supported on the carriage 62 by means of suitable pins 67 which extend through the weights and through suitable projecting portions of the carriage 62. The weights 66 have arm portions 70 which extend toward the axis of rotation of the carriage 62 and into notches in a suitable drive coupling 75. The drive coupling 75 is rotated by the arm portions 70 of the weights upon rotation of the weight members 66 and is movable axially upon movement of these arm portions axially. The arm portions 70 of the weight members 66 move axially due to centrifugal force upon changes in the speed of rotation of the carriage 62 which occurs when vehicle speed varies.

In accordance with one aspect of the present invention, an over-center snap-acting switch 80 is positioned to be operated by the drive coupling 75 of the speed sensing mechanism 60. As shown in FIG. 2, this switch includes a fixed contact 81 carried by a relatively stiff, depending arm 82 near the latter's lower end. As shown in FIG. 4, the upper end of this switch arm 82 is attached integrally to a cross piece 83 having a pair of openings 84 for passing respective mounting pins 85 (FIG. 2) for mounting it on a wall 23a of the speed governor housing 23. As shown in FIG. 2, a collar 86 of suitable dielectric material insulates the switch arm 82 from each mounting screw 85. The switch arm 82 carries a projecting tab 87 which is engaged by the inner end of an adjusting screw 88 threadedly mounted in another wall 23b of the speed governor housing 23. This adjusting screw presents a slot 89 at the outside of this housing for engagement by a screw driver to adjust the position of the fixed contact 81 to the right or to the left in FIG. 2.

The switch 80 has a snap-acting, self-biasing, over-center mechanism composed of a flexible blade member B and a bowed spring 102 (FIG. 4). Blade member B has a top cross piece 92 and a depending, readily flexible, resilient, metal switch arm 91 carrying a mobile contact 90 near its lower end. Blade member B also has a pair of flexible and resilient tension arms 93, 94 attached integrally to the top cross piece 92 and extending downward therefrom on opposite sides of the mobile switch arm 91. The lower ends of the tension arms have respective angularly disposed segments 95 and 96, whose lower ends are attached integrally to a flat tab 97 which engages the convex front face 98 of the drive coupling 75 in the speed sensing mechanism 60 (FIG. 2).

As shown in FIG. 4, the lower end tab 97 on blade member B supports an integral upwardly extending arm 99 whose upper end has an upwardly projecting tab 100. The mobile switch arm 91 terminates at its lower end in a similar tab 101 spaced above the tab 100. The bowed spring member 102 has a pair of openings which receive these tabs. The bowed spring member 102 is engaged under compression between the lower end of the mobile contact arm 91 and the upper end of the upstanding arm 99, and spring member 102 maintains the arms 93, 94 under tension.

As shown in FIG. 4, the top cross piece 92 of blade member B presents a pair of openings 103 for passing the respective mounting pins 85. Each of these openings receives a respective flanged grommet 104 (FIG. 2) of suitable dielectric material which insulates the mobile switch arm 91 from the mounting pins 85 and from the fixed switch arm 82.

As shown in FIG. 4, the switch 80 also includes an integral plate member 105 which presents a cross piece 106 at its upper end having openings 107 for receiving the grommets 104 and for passing the mounting pins 85. A pair of opposite legs 108, 109, extend down from the cross piece 106 and are joined at their lower ends to a curved tab 110 having a central opening 111 for receiving the reduced right end 112 of the core 40. As shown in FIG. 2, the core 40 presents an external annular shoulder 113 which bears against this tab 110 and, under the urging of the core spring 41, normally urges this tab 110 to the right in FIG. 2.

The plate member 105 also has a relatively stiff central leg 114 extending down from the cross piece 106 and terminating at its lower end in a lip 115 which projects toward the mobile switch arm 91. As shown in FIG. 2, this lip 115 provides a limit stop for the mobile switch arm 91 in the normal (open) condition of switch 80. An adjusting screw 116 is threadedly mounted in the wall 23a of the speed governor housing and its inner end engages the leg 114 to determine the position of the lip 115 to the right or to the left in FIG. 2.

FIGURE 2 shows the position of the parts before the speed sensing mechanism 60 has come up to a speed high enough to close the switch 80. At this time, the self-biasing action of blade member B and compression spring 102 is such that the mobile contact arm 91 is held with a positive spring force against the fixed stop provided by lip 115. The spring 41 urges the core 40 to the right in FIG. 2 and the shoulder 113 on the core forces the lower end tab 110 on plate member 105 to the right, so that the opposite legs 108, 109 of this plate member are flexed to the right of its depending middle leg 114 which carries lip 115. The compression spring 102 forces the lower end tab 97 of blade member B to the right against the drive coupling 75 in the speed sensing mechanism 60.

As the vehicle speed increases, the drive coupling 75 in the speed sensing mechanism 60 will move axially to the left in FIG. 2, forcing the lower end tab 97 on blade member B into engagement with the reduced left end 112 of core 40, as shown in FIG. 5. Such movement of the blade member B also moves to the left its upstanding leg 99 and the lower end of the compression spring 102. FIGURE 5 shows the position of the parts after such movement, with the line of engagement between the leg 99 and the compression spring 102 being still to the right of the plane $P_1$ of support for the mobile switch arm 91 which is provided by the lip 115. Consequently, in this position of the parts the compression spring 102 still maintains the mobile switch arm 91 against this lip 115 with a positive spring force.

As the vehicle speed increases further and the drive coupling 75 moves further to the left, the upstanding leg 99 on the blade member B which engages the lower end of the compression spring 102 will, at some predetermined vehicle speed, move over-center to the left of the aforementioned support plane $P_1$, and this will cause the upper end of the compression spring 102 to move the lower end of the mobile switch arm 91 abruptly to the right with a snap action until the mobile contact 90 engages the fixed contact 81, as shown in FIG. 6. The compression spring 102 will now hold the mobile contact 90 against the fixed contact 81 with a positive spring force until the upstanding leg 99 on switch blade member B is moved to the right of the new plane of support $P_2$ for the mobile switch arm 91. The position of this new plane of support $P_2$ is determined by the position of the fixed contact 81, whereas the original plane of support $P_1$ was determined by the position of the lip 115.

It will be evident, therefore, that the vehicle speed at which the switch 80 is closed (by movement of the upstanding arm 99 of blade member B to the left of support plane $P_1$) can be higher than the speed at which the switch will re-open (by movement of the upstanding arm 99 of blade member B to the right of the new support plane $P_2$). The switch-closing speed can be accurately pre-set by adjusting the position of the plane $P_1$ by means of the adjusting screw 116 (which determines the position of lip 115) while the speed sensing mechanism 60 is driven at a speed corresponding to the vehicle speed at which switch 80 is to close. The switch-opening speed can be accurately pre-set by adjusting the position of the plane $P_2$ by means of the adjusting screw 88 (which determines the position of fixed contact 81) while the speed sensing mechanism 60 is driven at a speed corresponding to the vehicle speed at which switch 80 is to open.

As explained hereinafter, the switch 80 functions as a minimum speed switch for the speed governor such that the governor unit 20 can be used to regulate the vehicle speed only after the vehicle reaches a predetermined minimum speed. Once the switch 80 has been closed, the governor unit 20 can be used to regulate the vehicle speed until it decreases to a speed somewhat lower than the predetermined minimum speed at which the switch 80 closed. That is, for example, switch 80 may close at a vehicle speed of 25 miles per hour but it will not re-open until the vehicle speed drops below 20 miles per hour.

The provision of this snap-acting switch 80 for operation by the speed sensing mechanism has several advantages. As already mentioned, the vehicle speed at which switch 80 closes and the vehicle speed at which it opens can be independently adjusted precisely, in accordance with the actual speed of the speed sensing mechanism 60, to provide a selected speed differential between the switch-closing speed (at which the governor unit 20 is turned on) and the lower switch-opening speed (at which the governor unit 20 is turned off), so as to maintain the governor's control over the vehicle speed if the vehicle speed drops below the governor turn-on speed, such as on a hill. Also, the opening and closing actions of the switch 80 take place substantially instantaneously, and the snap-acting over-center mechanism provides firm contact pressure and minimizes arcing between the contacts when the switch is closed. The snap-acting operation of the switch enables the use of noble metal switch contacts for longer switch life. The many advantages of the switch 80 also makes it desirable for use in controlling vehicle control mechanisms other than a speed governor, such as an overdrive mechanism, and such use is contemplated.

In accordance with another important aspect of the present invention, a novel vacuum release valve 120 (FIG. 1) is provided for rendering the speed governor unit 20 either operable or inoperable to control the vehicle speed. This release valve 120 is mounted in a recess 122 in the speed governor housing 23 which is in communication with the vacuum chamber 24.

As shown in enlarged detail in FIG. 7, the valve 120 has a solenoid coil 121 carried by a flanged annular housing 123 of suitable dielectric material which snugly, surrounds a sleeve 124 of suitable magnetizable metal. An annular liner 125 of rubber-like material fits inside the sleeve 124 and defines a valve passage 126 which is open to the atmosphere at its upper end. The lower end of the liner 125 presents a tapered annular tip 127 projecting down a short distance past the lower edge of sleeve 125 and providing a resilient, deformable valve seat.

A valve plate 128 of magnetically attractable metal is pivotally supported by a cross pin 129 for movement toward and away from this valve seat. This valve plate presents a tapered annular groove 130 on its top face for receiving the projecting lip 127 which provides the valve seat. A coil spring 131 is engaged under tension between the valve plate 128 and a fixedly positioned tab 132 to bias the valve plate counterclockwise in FIG. 7 to a position in which it is disengaged from the valve seat 127, so that the vacuum chamber 24 will be connected to the atmosphere by way of recess 122 and valve passage 126. The valve plate 128 has an integral, upwardly projecting lug 133 which is engageable with the adjacent side wall 134 to limit the extent to which the valve plate can move counterclockwise.

The valve plate 128 carries a flexible and resilient switch arm 135, which is attached to the valve plate by a rivet 136. The switch arm 135 is insulated from the valve plate 128 by a dielectric liner 137 between them and a dielectric grommet 138 at the rivet 136. The free end of the switch arm 135 carries a mobile switch contact 139 which is engageable with a fixed switch contact 140.

FIG. 7 shows the position of the parts when coil 121 is energized. At this time, the valve plate 128 is held by magnetic attraction in sealing engagement with the valve seat 127 and the switch contacts 139, 140 are closed. With the valve closed, the vacuum chamber 24 of the speed governor unit 20 is sealed off from the atmosphere.

However, when coil 121 is deenergized the valve plate 128 moves down away from the valve seat 127 under the urging of spring 131, the resiliency of the valve seat 127, and the pressure differential between passage 126 (at atmospheric pressure) and the vacuum chamber 24. Such movement of the valve plate also disengages the mobile switch contact 139 from the fixed switch contact 140. With the valve open, the vacuum chamber 24 is connected to the atmosphere by way of the valve passage 126, so that the speed governor unit 20 will be disabled (i.e., ineffective to control the vehicle speed).

The spring 131 alone exerts a sufficient biasing force on the valve plate 128 to move the latter to its open position independent of the described pressure differential between passage 126 and the vacuum chamber 24. Therefore, the valve has an extremely reliable "fail-safe" operation since it will open to disable the speed governor unit 20 whenever coil 121 is not energized.

The release valve coil 121 and the minimum speed switch 80 are connected in the electrical control circuit of the present speed governor, as shown schematically in FIG. 3. This circuit includes the previously-described lock-in coil 51, the release coil 121, the minimum speed switch 80, and the switch contacts 139, 140 operated by the release coil 121. This circuit also includes a battery 141, an ignition switch 142, a speed set switch 143, a speed resume switch 144, and a brake pedal switch 145.

The speed set switch 143 and the speed resume switch 144 are suitably mounted for manual operation by the driver of the vehicle, such as on the dashboard or steering wheel of the vehicle or on the turn signal indicator lever.

The speed set switch 143 has a mobile contact 146 which normally engages a fixed contact 147 to complete an energization circuit for the lock-in coil 51 from the battery 141 through the ignition switch 142. The speed set switch 143 has a normally-open fixed contact 148 connected to the release coil 121.

The speed resume switch 144 is normally open and is connected in parallel with the normally open contacts 146, 148 of the speed set switch 143.

The brake pedal switch 145 is normally closed and it is positioned to be opened by the brake pedal 149 (FIG. 1) of the vehicle when the brake is applied.

In the operation of this circuit, when the vehicle operator closes the ignition switch 141 upon starting the vehicle, an energization circuit for the lock-in coil 51 is completed from the battery 141 through the now-closed ignition switch 142 and the normally-closed contacts 146, 147 of the speed set switch 143. The energization of the lock-in coil 51 immediately causes the core member 40 to be locked to the flapper member 32. However, it should be understood that the release coil 121 for closing off the passage 126 to the atmosphere has not, as yet, been energized, and therefore no speed control may take place. The minimum speed switch 80 stays open until the vehicle speed exceeds the predetermined minimum speed (e.g., 25 miles per hour), at which time it closes.

If it is desired to activate the speed governor mechanism in order to maintain the vehicle at a predetermined driving speed, the operator must bring the vehicle up to the predetermined speed and when at that speed he operates the speed set switch 143 to close its contacts 146 and 148 and to open the circuit to the lock-in coil 51.

This operation of the speed set switch 143 also completes an energization circuit for the release coil 121 from battery 141, through the ignition switch 142, the now-closed contacts 146, 148 of switch 143, coil 121 and the now-closed minimum speed switch 80 to ground. Such energization of coil 121 causes it to close the switch contacts 139, 140 to complete a holding circuit for coil 121 from battery 141, through ignition switch 142, switch contacts 139, 140, the normally-closed brake pedal switch 145, coil 121, and the minimum speed switch 80 to ground. The energization of coil 121 also causes the release valve 120 to close, as described, sealing off the vacuum chamber 24 in the speed governor unit 20 from the atmosphere.

When the operator releases the speed set switch 143, its contacts 146, 147 close again to again energize the lock-in coil 51. Such energization of the lock-in coil causes the core 40 to be locked to the flapper 32, as described, so that the speed governor unit now regulates the vehicle speed.

After the speed set switch 143 is released, the release coil 121 remains energized through the described holding circuit. If the vehicle operator depresses the brake pedal 149, this will open the normally-closed brake pedal switch 145, breaking the holding circuit for the release coil 121. Consequently, the release coil 121 will be de-energized and the release valve 120 will open, connecting the vacuum chamber 24 in the speed governor unit to the atmosphere and thereby rendering the speed governor unit inoperative to control the vehicle speed. If now the operator releases the brake pedal when the vehicle speed exceeds the predetermined minimum speed to effect closing of switch 80, as described, the operator may reestablish the control of the speed governor unit 20 over the vehicle speed by closing the resume switch 144, which completes an energization circuit for the release coil 121.

The energization of the release coil 121 is at all times under the control of the minimum speed switch 80 such that opening of switch 80 at any time will render the governor unit 20 inoperative to regulate the vehicle speed. Failure of the speedometer drive cable will cause the speed-sensing mechanism 60 to open switch 80 and render the governor unit 20 inoperative. Such failure of the speedometer speed cable will cause the drive coupling 75 to move to the right in FIG. 2, permitting core 40 to move to the right to establish the maximum throttle opening position of flapper member 32. That is, core 40 would sense such failure as an underspeed condition of the vehicle. However, the opening of switch 80 under these conditions will render the governor unit 20 inoperative and thereby will prevent the vehicle speed from increasing under the control of core 40.

In view of the volume of air in the vacuum chamber 24 which must be evacuated in order to obtain movement of the diaphragm member 25 and in order to achieve accurate positioning of the diaphragm member 25 to its position corresponding to the desired speed, the speed governor unit 20 is constructed so as to effect rapid operation and quick movement of the diaphragm member 25 and is constructed so that the flapper member 32 moves an amount greater than that which is necessary to effect movement of the diaphragm member to its position to maintain the vehicle at the desired speed.

To perform this operation, the speed governor unit 20 includes a feedback mechanism for positioning the flapper 32 in accordance with the position of the diaphragm 25. The feedback mechanism which is connected between the diaphragm 25 and the flapper 32 includes a means for moving the flapper 32 toward the vacuum nozzle 33 as the diaphragm member 25 moves in its throttle opening direction independent of the sensing means which moves the core 40. This mechanism includes a suitable lever member formed of a length of wirelike material and designated 160 in FIGS. 1 and 2. The member 160 has one end 161 thereof riding on the diaphragm member 25, as shown in FIG. 1, and the other end thereof is coiled about a pin member 162 (FIG. 2) and is pivotal about the pin member 162. The end of the member 160 which is wound about the pin member 162 has a cam portion 163 which extends through an opening in a lower end projection 164 on the flapper member 32.

When the diaphragm member 25 moves in its throttle opening direction, the lever member 160 moves and pivots about the pin member 162, and the cam portion 163 of the member 160 moves through the opening in the lower end projection 164 on flapper member 32 and effects movement of the lower end of the flapper to the right in FIG. 2. The upper end of the flapper member 32 however, moves toward the vacuum nozzle 33.

Prior to energization of the lock-in coil 51, the flapper member 32 of the speed governor unit is in engagement with the vacuum nozzle 33 and the vacuum chamber 24 is in communication with the atmosphere through the nozzle 34. Upon energization of the lock-in coil 51, the flapper member 32 is pivoted, as described hereinabove, and is moved away from the vacuum nozzle 33 to a position between the vacuum nozzle 33 and the nozzle 34 connected to the atmosphere. When in this position, a vacuum is applied to the chamber 24 and the diaphragm member 25 begins to move in a speed increasing direction. As the diaphragm member 25 moves in a speed increasing direction due to the operation of the feedback mechanism, the flapper member 32 moves toward the vacuum nozzle 33.

The flapper member 32 will move toward the vacuum nozzle 33 as long as the diaphragm member 25 continues to move, and the diaphragm member will continue to move as long as the vacuum in the chamber 24 is sufficient to overcome the bias of the springs 28 and 11 which resist movement of the diaphragm member. As the flapper member 32 moves toward the vacuum nozzle 33, the vacuum in the vacuum chamber 24 acting on the diaphragm member 25 reduces and movement of the flapper member 32 toward the vacuum nozzle 33 stops when the vacuum in the vacuum chamber substantially equals the force applied by the springs 11 and 28 to the diaphragm member, in which condition the diaphragm member is, in a sense, in an equilibrium state with the vacuum acting to move the diaphragm member in one direction and the springs acting to move the diaphragm member in the opposite direction. Since the force applied by the spring 11 to the diaphragm member will vary depending upon the speed at which the vehicle is driven flapper member 32 for any given speed will vary, as noted hereinabove.

In the event that the vehicle speed decreases, the flapper member 32 will move with the core member 40 to the right, as described hereinabove, and away from the vacuum nozzle 33. This will cause a greater vacuum to be applied to the vacuum chamber 24 and cause the diaphragm member 25 to move in a throttle increasing direction to thereby increase the speed of the vehicle. Due to the movement of the diaphragm member in this throttle increasing direction, the flapper member 32 moves toward the vacuum nozzle 33 because of the action of the feedback mechanism. The diaphragm member continues to move until it again achieves its equilibrium state as described hereinabove, and at this time, the flapper member 32 will be in a position to maintain the vehicle at the desired or preset speed. In the event that it is desired to increase the vehicle speed above the preset or locked-in speed, the operator may depress the accelerator pedal 13 to increase the vehicle speed above the desired speed due to the chain and one-way connection to the diaphragm and throttle members, respectively. As the vehicle speed increases, the flapper member 32 moves toward the vacuum nozzle 33 and the diaphragm member 25 moves downward in FIG. 1. When the operator removes his foot from the accelerator pedal 13 and as a result the vehicle speed is decreased, the flapper member 32 will move away from the vacuum nozzle 33 due to movement of the core member 40 to the right, as viewed in the drawings, and the diaphragm member 25 will move in its speed increasing direction until it again achieves the equilibrium state discussed hereinabove.

Having described my invention, I claim:

1. A vehicle speed governor comprising a vacuum-operated speed governor unit, electrically energizable coil means for rendering said governor unit operable to control the vehicle speed, a normally open minimum speed switch connected in circuit with said coil means to control the latter's energization, and speed sensing means movable in accordance with the vehicle speed for operating said switch, said switch having a self-biased, over-center, snap-acting mechanism positioned for operation by said speed sensing means and normally maintaining the switch open, said snap-acting mechanism being movable against its self-bias by said speed sensing means to an over-center position in which it closes the switch at a predetermined minimum vehicle speed and being maintained in said over-center position by said speed sensing means until the vehicle speed has decreased below said predetermined speed.

2. A vehicle speed governor according to claim 1, wherein said governor unit has a vacuum chamber, and further comprising a vacuum release valve connected between said vacuum chamber and the atmosphere, and spring means normally maintaining said valve open to connect said vacuum chamber to the atmosphere so as to render said governor unit inoperable to control the vehicle speed, and wherein said coil means when energized closes said valve to block said vacuum chamber from the atmosphere and thereby render said governor unit operable to control the vehicle speed.

3. A vehicle speed governor according to claim 2 wherein said valve has a passage communicating with the atmosphere, a valve seat at said passage, and a valve member pivotally mounted for movement toward and away from said valve seat, said valve member being magnetically attractable into sealing engagement with said valve seat by said coil means when the latter is energized.

4. A vehicle control mechanism having electrically operated means for rendering said control mechanism operable, switch means controlling the operation of said electrically operated means and having a normal condition and actuated condition, and speed sensing means operable in response to the vehicle speed for operating said switch means, the improvement wherein said switch means comprises an over-center, snap-acting mechanism which is movable over-center in one direction by said speed sensing means in response to increasing vehicle speed to operate said switch means from its normal condition to its actuated condition at a predetermined minimum speed of the vehicle and which is movable over-center in the opposite direction from said actuated condition to said normal condition in response to decreasing vehicle speed below said predetermined minimum speed, said control mechanism comprising a speed governor unit for controlling the vehicle speed, and wherein said electrically operated means comprises a normally open valve and a coil which is energizable to close said valve, and said switch means is connected to control the energization of said coil, said switch means in its normal condition being open to de-energize said coil and in its actuated condition being closed to complete an energization circuit for said coil.

5. A vehicle control mechanism having electrically operated means for rendering said control mechanism operable, switch means controlling the operation of said electrically operated means and having a normal condition and an actuated condition, and speed sensing means operable in response to the vehicle speed for operating said switch means, the improvement wherein said switch means comprises an over-center, snap-acting mechanism which is movable over-center in one direction by said speed sensing means in response to increasing vehicle speed to operate said switch means from its normal condition to its actuated condition at a predetermined minimum speed of the vehicle and which is movable over-center in the opposite direction from said actuated condition to said normal condition in response to decreasing vehicle speed below said predetermined minimum speed, said switch means having a stop which defines the normal position of said snap-acting mechanism, and means for selectively adjusting the position of said stop to determine said predetermined minimum speed at which the switch means will be operated from its normal condition to its actuated condition.

6. A vehicle control mechanism having electrically operated means for rendering said control mechanism operable, switch means controlling the operation of said electrically operated means and having a normal condition and an actuated condition, and speed sensing means operable in response to the vehicle speed for operating said switch means, the improvement wherein said switch means comprises an over-center, snap-acting mechanism which is movable over-center in one direction by said speed sensing means in response to increasing vehicle speed to operate said switch means from its normal condition to its actuated condition at a predetermined minimum speed of the vehicle and which is movable over-center in the opposite direction from said actuated condition to said normal condition in response to decreasing vehicle speed below said predetermined minimum speed, said switch means having a stop which defines the position to which said snap-acting mechanism is operated by said speed-sensing means, and means for selectively adjusting the position of said stop to determine the speed at which said switch means will return from its actuated condition to its normal condition.

7. A vehicle control mechanism having electrically operated means for rendering said control mechanism operable, switch means controlling the operation of said electrically operated means and having a normal condition and an actuated condition, and speed sensing means operable in response to the vehicle speed for operating said switch means, the improvement wherein said switch means comprises an over-center, snap-acting mechanism which is movable over-center in one direction by said speed sensing means in response to increasing vehicle speed to operate said switch means from its normal condition to its actuated condition at a predetermined minimum speed of the vehicle and which is movable over-center in the opposite direction from said actuated condition to said normal condition in response to decreasing vehicle speed below said predetermined minimum speed, said control mechanism comprising a vacuum operated speed governor unit having a vacuum chamber, and wherein said control means comprises a valve connected between said vacuum chamber and the atmosphere, spring means normally maintaining said valve open to connect said vacuum chamber to the atmosphere so as to disable said speed governor unit, and coil means energizable to close said valve to block said vacuum chamber from the atmosphere, and wherein said switch means is connected to said coil means to complete an energization circuit for the latter when said switch means is operated to its actuated condition.

8. A speed governor according to claim 7 wherein said valve has a passage communicating with the atmosphere, a valve seat at one end of said passage, and a valve plate pivotally mounted for movement toward and away from said valve seat and magnetically attractable into sealing engagement with said valve seat by said coil means when the latter is energized, and further comprising circuit means for initially energizing said coil means to close said valve, and switch means for completing a holding circuit to maintain said coil means energized independent of said circuit means, said last-mentioned switch means including a flexible and resilient switch contact arm attached to said valve plate for movement therewith, a mobile switch contact on said switch arm, and a fixed switch contact positioned for engagement by said mobile contact when said valve plate seats against said valve seat, and wherein said spring means biases said valve plate away from engagement with said valve seat to disengage said mobile contact from said fixed contact.

9. A vehicle control mechanism having electrically operated means for rendering said control mechanism operable, switch means controlling the operation of said electrically operated means and having a turned-on or closed condition and a turned-off or open condition, speed sensing means operable in response to the vehicle speed for turning on said switch means at a first predetermined speed and turning off said switch means at a second speed with said second speed being a given speed differential below said first speed, said switch means comprising an over-center snap-acting mechanism operatively associated with the speed sensing means to effect opening and closing of said switch means in response to said speed sensing means, and means for adjusting said speed differential between said first and second predetermined speeds.

10. In a vacuum operated vehicle speed governor unit having a vacuum chamber, a vacuum release valve having a passageway communicating said vacuum chamber with the atmosphere, spring means normally maintaining the valve open to connect said vacuum chamber to the atmosphere so as to disable said speed governor unit, electrical coil means encircling said passageway, a valve seat at said passageway, a valve member pivotally mounted for movement toward and away from said valve seat and magnetically attractable into sealing engagement with said valve seat by said coil means when the latter is energized, circuit means for initially energizing said coil means to close said valve, a holding circuit for holding said coil means energized when said valve member engages said valve seat, switch means for completing said holding circuit to maintain said coil means energized independent of said circuit means, said switch means including a flexible and resilient switch contact arm attached to said valve member for movement therewith, a mobile switch contact on said contact arm and a fixed switch contact positioned for engagement by said mobile switch contact when said valve member seats against said valve seat, said mobile contact being disengaged from said fixed contact when said valve member is moved away from said valve seat and engaging said fixed contact when said valve member seats against said valve seat, and said spring means biases said valve member away from engagement with said valve seat to disengage said mobile contact from said fixed contact.

References Cited

UNITED STATES PATENTS

| | | | |
|---|---|---|---|
| 2,701,475 | 2/1955 | Readeker. | |
| 3,166,145 | 1/1965 | Wheeler | 180—108 |
| 2,906,833 | 9/1959 | Long et al. | 200—80 |
| 2,990,825 | 7/1961 | Fuller et al. | 180—106 X |
| 3,052,775 | 9/1962 | Harada | 200—80 |
| 3,225,157 | 12/1965 | Williams | 200—80 |
| 3,324,978 | 6/1967 | Mueller et al. | 180—108 |
| 3,332,406 | 7/1967 | Perry et al. | 180—105 X |
| 3,340,952 | 9/1967 | Day | 180—108 |

KENNETH H. BETTS, *Primary Examiner.*

U.S. Cl. X.R.

123—103; 200—67, 80